Figure 1:
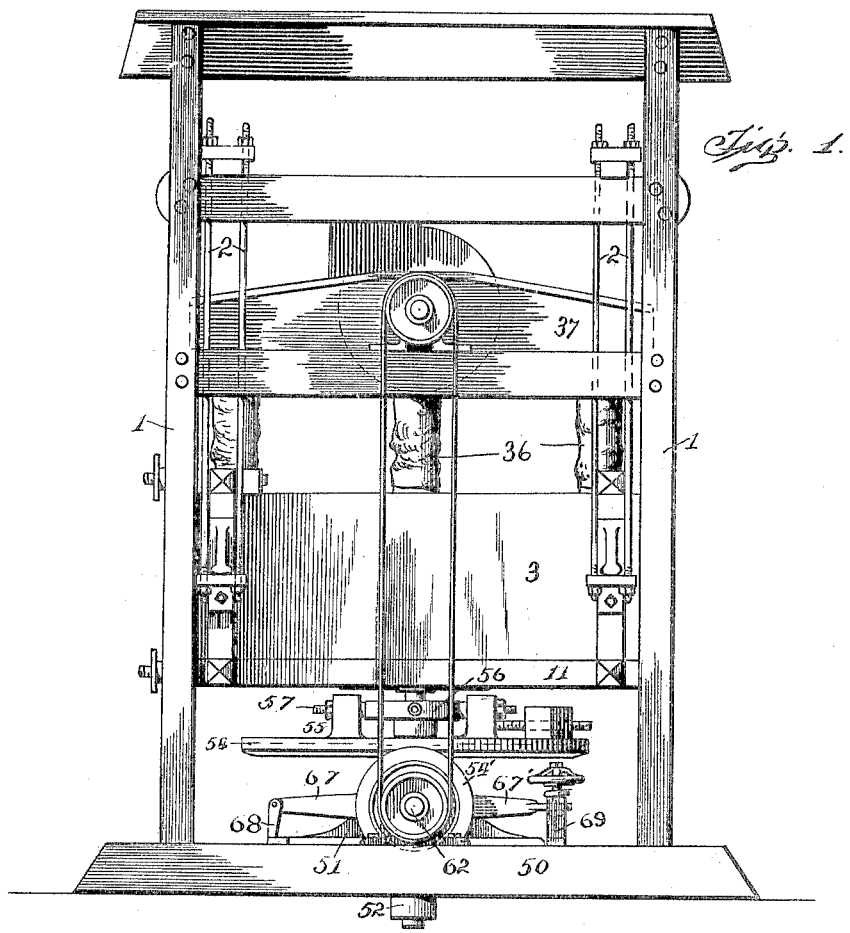

No. 802,563. PATENTED OCT. 24, 1905.
T. W. GRAHAM.
BOLTING MACHINE.
APPLICATION FILED MAY 16, 1902.

5 SHEETS—SHEET 1.

Witnesses
L. G. Handy
Geo. T. May Jr.

Inventor
Thomas W. Graham
By R. S. Bacon
Attorney

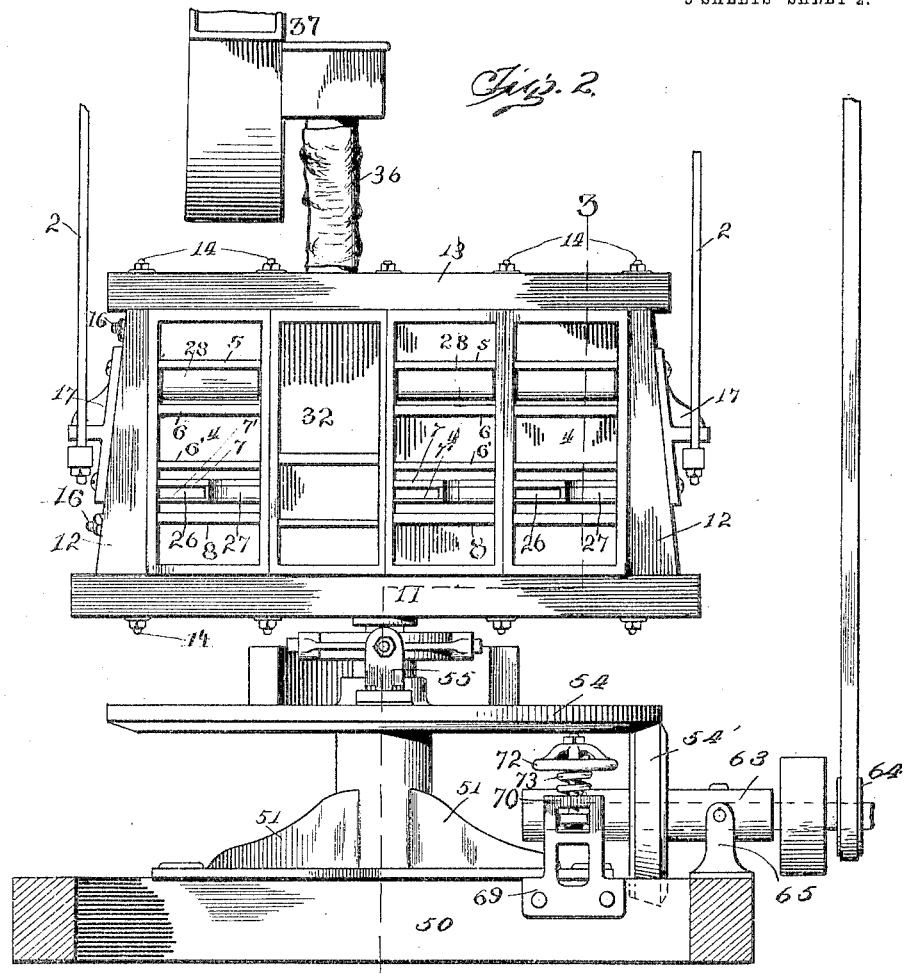
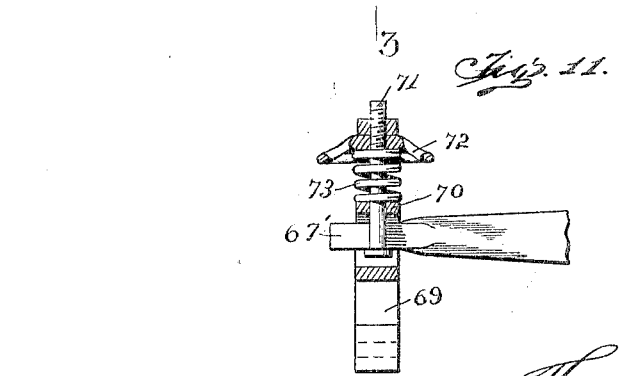

No. 802,563. PATENTED OCT. 24, 1905.
T. W. GRAHAM.
BOLTING MACHINE.
APPLICATION FILED MAY 16, 1902.
5 SHEETS—SHEET 3.
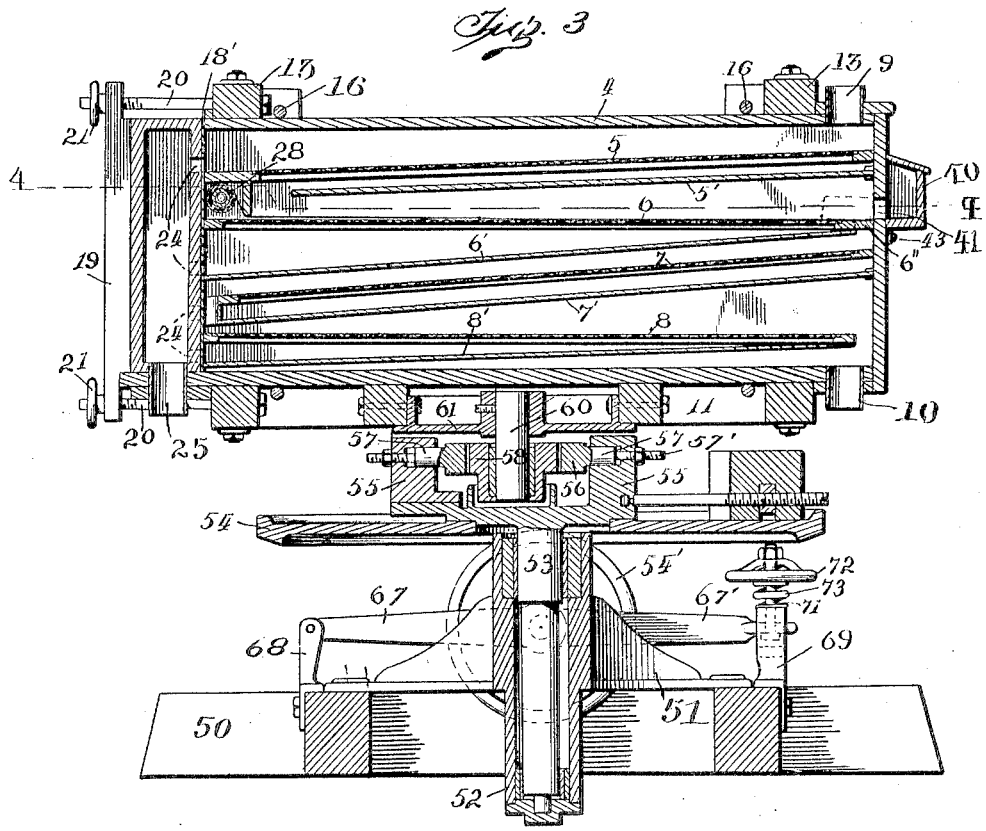
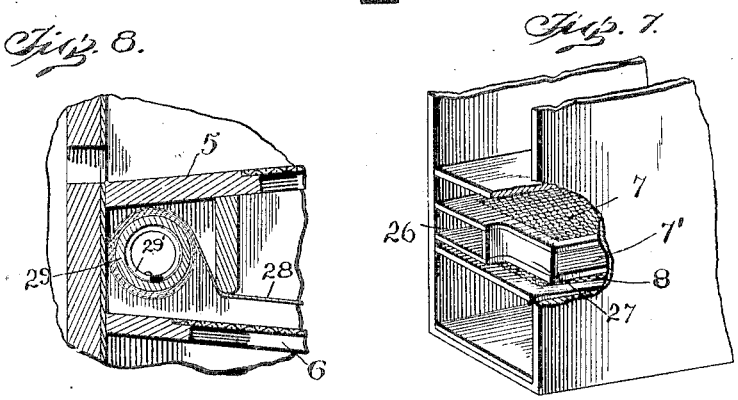
Witnesses
L. G. Handy
Geo. T. May Jr.
Inventor
Thomas W. Graham
By R. S. Bacon
Attorney No. 802,563. PATENTED OCT. 24, 1905.
T. W. GRAHAM.
BOLTING MACHINE.
APPLICATION FILED MAY 16, 1902.
5 SHEETS—SHEET 4.
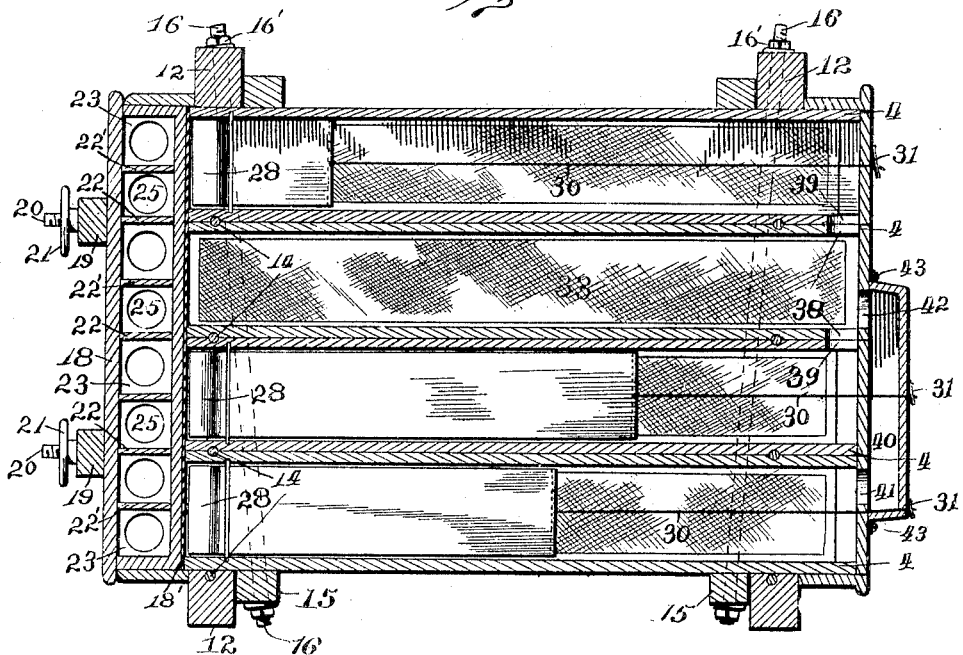

No. 802,563. PATENTED OCT. 24, 1905.
T. W. GRAHAM.
BOLTING MACHINE.
APPLICATION FILED MAY 16, 1902.

5 SHEETS—SHEET 5.

UNITED STATES PATENT OFFICE.

THOMAS W. GRAHAM, OF DUBUQUE, IOWA, ASSIGNOR TO THE DUBUQUE TURBINE AND ROLLER MILL COMPANY, OF DUBUQUE, IOWA, A CORPORATION OF IOWA.

BOLTING-MACHINE.

No. 802,563.   Specification of Letters Patent.   Patented Oct. 24, 1905.

Application filed May 16, 1902. Serial No. 107,671.

*To all whom it may concern:*

Be it known that I, THOMAS W. GRAHAM, a citizen of the United States, residing at Dubuque, in the county of Dubuque and State of Iowa, have invented certain new and useful Improvements in Bolting-Machines; and I do hereby declare the following to be a full, clear, and exact description of the invention, such as will enable others skilled in the art to which it appertains to make and use the same.

My invention relates to bolting-machines, and is embodied in the features of construction and arrangement hereinafter described, and pointed out in the claims.

Some of the objects of my invention are, first, to provide a machine wherein the material may be sifted and purified as a continuous operation without removal from the machine and to provide for the delivery of the material from the sifter to the purifier without the employment of independent conveyer mechanism; second, to construct the body of the machine of a series of separable unit sections; third, to provide means for giving easy access to the interior of the sieve-box and for insuring a proper separation of the products of the machine, and, fourth, to provide means for varying the bolting capacity of the machine while in operation.

Further objects of my invention are to provide improved driving mechanism for imparting a gyratory motion to the sieve-box, including means for readily starting, stopping, and regulating the speed of the machine, means for automatically maintaining the bearing of the crank-pin in alinement with said pin to minimize friction and reduce the liability of the parts to breakage or wear, and means for adjusting the crank-pin bearing relative to its driving part to vary the eccentricity thereof.

In the drawings, wherein I have illustrated one embodiment of my invention, similar numbers indicate like parts throughout the various figures.

Figure 6:
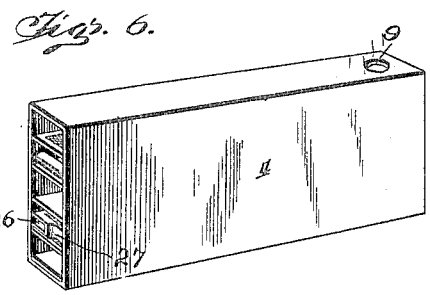
Figure 9:
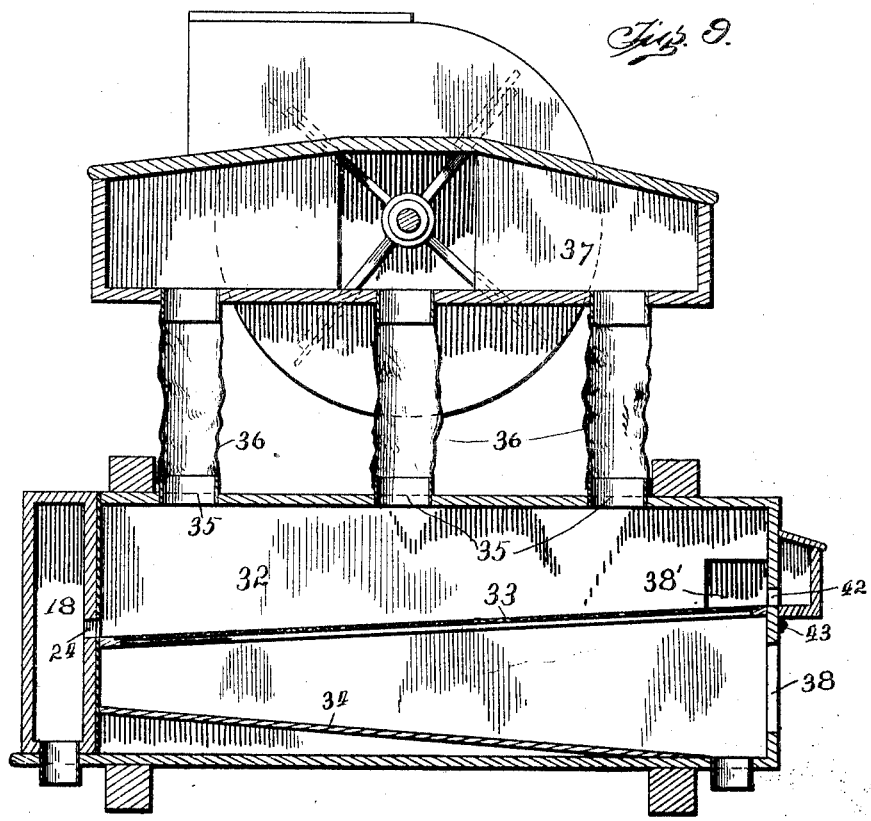
Figure 10:
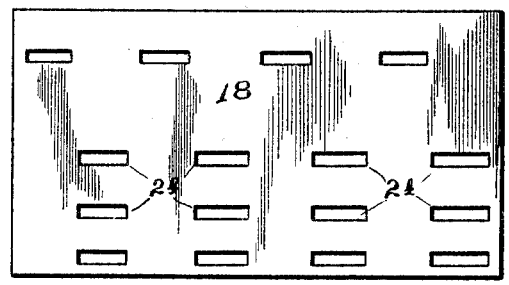

Figure 1 is a side elevation of a complete machine embodying my invention. Fig. 2 is an end elevation of the same, showing the sieve-box with parts removed to expose the interior thereof. Fig. 3 is a vertical section on line 3 3 of Fig. 2. Fig. 4 is a horizontal section on line 4 4 of Fig. 3. Fig. 5 is a top plan view of the driving mechanism. Fig. 6 is a perspective view of a sifting unit detached. Fig. 7 is a detail perspective view of the part of the delivery end of a sifter-section. Fig. 8 is a detail illustrating a convenient arrangement of the roll of the bolting-regulator. Fig. 9 is a vertical section through the purifier-section and fan-casing. Fig. 10 is an elevation of the distributing-door detached. Fig. 11 is a detail of the regulating mechanism for the driving-gear.

In the drawings, 1 represents a framework of any suitable form to afford proper support for the working parts of my improved machine.

2 2 are suspension-rods depending from suitable points on the framework and supporting the sieve-box 3 at their lower ends to permit said sieve-box to oscillate in a manner well known in the art.

By the term "sieve-box" as herein used I intend to designate generally the body structure of the machine wherein the sifting and purifying operations are carried on without regard to the specific nature of such operations or the means of their accomplishment.

The sieve-box is operatively associated with suitable driving means located therebeneath and adapted to impart thereto a gyratory motion, as will be hereinafter more fully set forth.

The sieve-box 3 is formed of a series of unit sections 4, each in itself a complete separator adapted to perform its sifting or purifying action independently of other sections having a similar function and of such dimensions that when in place it forms a longitudinal section or compartment of the complete sieve-box. These unit sections, whether sifters or purifiers, are preferably similar in exterior dimensions and construction, so that they may be kept in stock by the manufacturer to be interchangeably assembled in any desired number or manner to satisfy the particular requirements of each customer, and so that any section may be removed and replaced by another without necessitating the alteration of the rest of the machine or disturbing the remaining sections. In assembling the units a suitable frame, such as that hereinafter described, is employed, and the sections are closely associated therein, side by side, to form a compact whole. As best shown in Fig. 6, each section 4 constitutes a box closed on all sides and at one end, the other end being left open to give free access to the interior of the section. Each bolting or sifting section is provided with a series of removable bolts or sieves arranged one above the other in the usual manner—that is to say, with the alternating sieves inclined in opposite directions. Each section is provided with a sufficient number of sieves to complete the sifting operation, the present illustration showing four such sieves, (designated, respectively, as 5, 6, 7, and 8.) Beneath each sieve is arranged a carrier-board for conveying the sifted material, the respective boards being indicated by 5', 6', 7', and 8'. As shown, the carriers are all inclined in the same direction and are so arranged that the uppermost carrier 5' delivers to the screen 6, while the other carriers deliver the material conveyed thereby to the open end of the sieve-box. The uppermost coarsest sieve 5 likewise delivers the coarse material separated thereby to the open end of the sieve-box, and the remaining sieves deliver from one to another in the usual manner. An inlet-opening 9 is provided near the head end of each section, in the top thereof, and an outlet 10 is located beneath the delivery end of the last sieve to carry off the middlings. These openings may be provided with spouts or trunks of any preferred construction. This arrangement of sieves and carriers and discharge-openings may be varied somewhat in practice to suit requirements.

In assembling the sieve-box sections a holding-frame, preferably formed of timbers, is employed, comprising a rectangular base 11, uprights 12 at the sides thereof near the opposite ends, and cross-pieces 13 13, uniting the opposite uprights 12. The uprights and cross-pieces are so joined as to permit of ready separation and slight play of the cross-pieces upon the uprights for purposes of adjustment. Tie-rods 14, screw-threaded at their ends for the reception of securing-nuts, are arranged between the sections, taking through the base-frame 11 and the cross-pieces 13 to secure the frame firmly together and clamp the cross-pieces tightly against the top of the sieve-box sections. On one side of the frame are arranged supplemental clamping-bars 15, connected by tie-rods 16 with the opposite uprights 12 on the opposite side to clamp the sections together laterally. By tightening the nuts 16' on the ends of said rods all slack may be taken up and warping prevented. These rods 14 also constitute locking devices which efficiently secure the several sections against displacement during the operation of the machine, although the several sections can easily be removed and interchanged one for the other by removing the rods from the grooves 14', in which they rest when the sections are in their operative positions.

17 indicates brackets secured to the uprights 12 for the reception of the suspension-rods 2.

18 indicates a combined door and distributer adapted to close the rear or tail end of the sieve-box and to afford means for distributing the different grades of material separated by the machine to suitable discharge-points. I prefer to construct these distributing-doors as units of different sizes adapted to accommodate different numbers of separator-sections, so that when a door is associated with a suitable number of said sections it forms a continuation thereof. Doors of various sizes may be kept in stock ready to be assembled with suitable separator-sections to fill each particular order. The door is secured in place at the open end of the sieve-box by clamps 19, adjustably connected to the base-frame 11 and cross-piece 12 by bolts 20, provided at their outer ends with nuts 21, bearing against said clamps 19. A packing-strip 18', of felt or the like, is interposed between the sieve-box and door at their exterior edges to tightly close the joint.

The door 18 is constructed in the form of a closed box and is divided interiorly by vertical partitions 22 into a series of large compartments equal in number to the assembled sieve-box sections, each of which compartments is subdivided by partitions 22' into two or more vertically-disposed distributing compartments or channels 23.

The inner wall of the distributing-door 18 is provided with a series of apertures 24, communicating with the distributing-channels, and the bottom thereof is provided with a series of outlet-openings 25, one of which communicates with each distributing-channel. The apertures 24 are located at such levels and in communication with such distributing-channels of the door that the different channels receive material of different grades. Thus in the present embodiment of my invention the inlet-aperture 24, communicating with the right-hand channel of each large compartment, as viewed from the rear end of the machine, is at the level of the delivery end of the uppermost sieve, so as to receive the coarse material therefrom, and the remaining apertures of each large compartment (three in number) all communicate with the left-hand channel at levels corresponding with the delivery ends of the three carrier-boards 6', 7', and 8'. In operation, therefore, in each sifting-section the coarse material is separated at the uppermost level and delivered to one distributing-channel, the flour received by the three lower carrier-boards is delivered to the other channel, and the middlings are passed from sieve to sieve to the outlet 10 in the bottom of the section, unless other disposition is made thereof, in a manner hereinafter described.

It will be noted that the sieve 7 and its carrier-board 7' deliver at the same end of the machine, and to provide for the proper delivery of the separated products therefrom I cut away a portion of the carrier-board and sieve and wall up the edge of the cut portions, as shown in Figs. 6 and 7, to form a spout 26, arranged to establish communication between the carrier-board and one of the apertures 24 and at the same time to leave an open passage 27, extending vertically from the sieve 7 to the sieve 8, to permit material to pass freely from one screen to the other without intermixture with the flour conveyed by the carrier-board.

While I have shown but two distributing-channels in the hollow door and find that number to be usually sufficient, it is obvious that a greater number of channels might be employed in connection with some or all of the sections and the gradation of the material carried further than herein provided for. It will also be apparent that instead of a single door divided into large compartments to correspond with the number of sections employed in forming the sieve-box a separate door or distributer might be provided for each section without departing from the principle of my invention.

To regulate the bolting capacity of the machine, I employ in connection with one of the sieves or bolts in each section a curtain 28, preferably of canvas or similar flexible material, arranged at the receiving end of such sieve and adapted to be extended or retracted to cover all or any desired portion of the bolting-surface. The curtain 28 is carried by a roll 29, preferably of the ordinary curtain-shade type, containing a retracting-spring 29', whereby the curtain may be rolled up. Secured to the free end of the curtain is a controlling-cord 30, extending to the exterior of the sieve-box. A spring-clip 31 or other suitable holding device may be employed for securing the end of the cord. By means of the cord the operator may adjust the curtain to any desired position without interfering with the operation of the machine, thereby increasing or decreasing the bolting-surface and regulating the bolting capacity of the section. It will be observed that the curtain rests upon the top of the screen or bolting-surface of the screen when extended so as to lie flat thereagainst, and thereby efficiently cut off any portion of the screen—a desirable result which could not be as readily accomplished if the curtain be manipulated to move under the sagging of said curtain, which would prevent the successful accomplishment of the desired result. While the curtain might be associated with any one of the sieves in any section, I prefer to employ it in connection with the first flour-sieve, as the curtain tends to prevent specks of bran or other impurities from passing through the bolt with the flour by reducing the capacity of the coarsest flour-cloth, which affords the most chances for the impurities to sift through with the flour.

I have thus far described the sifter mechanism alone; but my invention contemplates the employment therewith of a purifying-section, which I will now describe.

The box or casing of the purifier-section 32 is preferably similar to those of the sifting-sections, but contains only a single sieve 33 and carrier-board 34. The top of the purifier is provided with a series of apertures 35, communicating, through air-trunks 36, with the casing 37 of an air-exhaust fan. Air is supplied to the purifier through an inlet-opening 38 below the screen 33. As shown, the screen 33 corresponds in position and inclination with the carrier-boards 6' of the sifting-sections, so that its head or feed end is slightly below the level of the sieve 6 and its delivery end on the level of one of the apertures 24 in the door 18; but its position may be altered to suit the requirements of any particular machine. The middlings to be purified are fed to the head end of the sieve 33 through apertures 38' in the side walls of the purifier-section, which register with corresponding apertures 39 in the side walls of the adjacent sifter-sections. The gyratory motion of the sieve-box causes the middlings separated by the sieve 6 to pass through said openings 38' and 39 onto the sieve 33, where they are met by the air-blast and are purified in the usual way, the heavy material passing out through the aperture 24 at the delivery end of the purifier-sieve into one of the channels of the door 18 and the light particles being blown out through the fan-casing. If it is desired that more than two of the sifter-sections should deliver material to be purified to the purifier-section, I provide for feeding the material from the sections which cannot be put in direct communication therewith to the purifier by securing to the head end of the sieve-box a slightly-inclined by-pass trough 40, arranged to take from apertures 41 in the head walls of such remote sections and deliver to an aperture 42 in the head wall of the purifier-section. The by-pass trough is secured to the sieve-box by screws 43 or other suitable retaining means, so as to be readily detachable therefrom. When a trough is to be used as described, it is necessary to extend the sieve 6 of the remote section with which it communicates clear to the end wall of the section that the middlings may pass through the aperture 41 therein. To this end I interpose between the end of the sieve and the end wall of the section a suitable filling-piece 6'', completely closing the space between said parts. In practice, however, more than two sifter-sections are seldom connected with the purifier, and in such case the by-pass trough is dispensed with. The apertures necessary to secure the feeding of the material from the sifters to the purifier may be cut to suit the requirements of the particular order, the walls of all of the sifter-sections being left imperforate when no purifier is employed.

By the arrangement described I provide a machine wherein the sifting and purifying operations are continuous and wherein the transfer of the material from the sifter to the purifier is effected simply by the motion of the machine, without the aid of elevating mechanism or an independent conveyer.

To impart a gyratory motion to the sievebox, I employ means which I will now describe.

50 is a base-frame to which is secured, by suitable brackets 51, a vertical bearing-socket 52, in which is journaled a spindle or shaft 53, carrying at its upper end a concentric flywheel 54, mounted to rotate in a horizontal plane and having its edge beveled for engagement with a friction driving-gear 54'.

55 indicates bearing-blocks formed integral with or rigidly secured relatively to the flywheel to form a bearing eccentric to the axis of rotation thereof.

56 is an annular ring mounted on trunnions 57, bearing on the blocks 55 and carrying within it a concentric bearing ring or sleeve 58, pivotally mounted on pins 59, extending at right angles to the trunnions 57 and journaled in the ring 56 to form a gimbal-bearing for a crank-pin 60, rigidly secured to a plate 61, mounted on the base-frame 11 of the sievebox. The ends of the trunnions 57 journaled in the block 55 bear against set-screws 57', disposed in alinement with the axis of the trunnions and adjustable to vary the position of the gimbal, and consequently change the range of movement of the sieve-box. By this arrangement the pin 60 and its bearing-sleeve 58 are kept in proper alinement at all times, and the strain and wear upon both of said parts are consequently reduced to a minimum.

Motion is imparted to the fly-wheel 54 by a beveled friction driving-gear 54', carried by a shaft 62, journaled in a bearing-sleeve 63 and carrying a pulley 64, adapted to be driven from a suitable source of power. The bearing-sleeve 63 is pivotally mounted in horizontal bearings upon a bracket 65, so that the inner end of the shaft 62 may be raised or lowered to bring the gear 54' into or out of engagement with the fly-wheel 54 or to vary the degree of frictional contact, and so regulate within certain limits the speed of the machine. I provide means for so moving or adjusting said gear as follows: 66 is a sleeve arranged to receive the inner end of the shaft 62, and 67 and 67' are lever-arms extending from said sleeve in opposite directions. The arm 67 is mounted at its extremity upon a horizontal pivot bearing in a bracket 68, secured to the base-frame 50. The arm 67' extends to the opposite side of the frame through an opening in a bifurcated bracket 69, mounted on the frame. The bracket 69 is provided with a top bearing-plate 70, extending over the end of the arm 67' and provided with an aperture therein through which passes a vertical stem 71, screw-threaded at its upper end and at its lower extremity secured to the end of the lever-arm 67'. On the screw-threaded portion of the stem is mounted an adjustable hand-wheel 72, and between said hand-wheel and the top 70 of the bracket is interposed a coiled expansion-spring 73 of limited expansibility surrounding the stem 71. The adjustment of the hand-wheel upon the stem serves to raise and lower the gear 54' into and out of engagement with the fly-wheel 54 and to compress the spring to varying degrees of tension. Thus the machine may be stopped entirely by throwing the friction-gears out of contact or the pressure exerted between said gears regulated to a nicety, thereby permitting a greater or less amount of slippage, and so regulating the speed of the machine. The yielding bearing afforded by the spring-supported lever likewise compensates for sudden strains due to irregularities in the bearing-surfaces of the gears, preventing breakage of the parts.

While I have herein described the preferred form of my invention, it will be apparent that many slight changes might be made therein without departing from the spirit of my invention.

What I claim as new, and desire to secure by Letters Patent, is—

1. In a machine of the character described, a sieve and a curtain resting upon the upper surface thereof and supported thereby adapted to be adjusted to regulate the sifting capacity of the sieve in combination with a roller upon which the curtain is wound mounted so that said curtain entirely cuts off delivery from the sieve from the end thereof adjacent to said roller.

2. In a machine of the character described, a sieve, and a curtain therefor directly thereabove, a spring-winding roller for said curtain at one end of the sieve, and an operating-cord connected to the free end of the curtain and extending without the machine through the end wall thereof opposite that adjacent to the spring-roller in combination with a roller upon which the curtain is mounted so that said curtain entirely cuts off delivery from the sieve from the end thereof adjacent said roller.

3. In a machine of the character described, a plurality of unitary sifting-sections compactly arranged side by side each independent of the others and constituting a complete separator, a supporting-frame therefor, and means for removably securing the sections in said frame, each of said sections being removable intact from the said frame.

4. In a machine of the character described, a plurality of unitary sifting-sections compactly arranged side by side each independent of the others and constituting a complete separator, a supporting-frame therefor, and means for removably securing the sections in said frame, each of said sections being removable intact from the said frame, and the tops and bottoms of the several sifting-sections combining to constitute the top and bottom walls of the machine.

5. In a machine of the character described, a plurality of unitary sifting-sections compactly arranged side by side each independent of the others and constituting a complete separator, a supporting-frame therefor, and means for removably securing the sections in said frame, each of said sections being removable intact from the said frame, and said securing means including vertically-disposed clamping-bars passing between the adjoining side walls of the sifting units.

6. In combination with a supporting-frame, having an open unobstructed end, a plurality of unitary sifting-sections compactly arranged side by side mounted in said frame and removable through said open end thereof, and means for securing the sections in said frame, each of said sections being removable intact from the frame.

7. In a machine of the character described, a plurality of unitary sifting-sections compactly arranged side by side each independent of the others and constituting a complete separator, a supporting-frame therefor, and means for removably securing the sections in said frame, each of said sections being removable intact from the said frame, and having provision whereby they may be made intercommunicating.

8. In combination with a supporting-frame, a plurality of unitary sifting-sections compactly arranged side by side each independent of the others and constituting a complete separator, said sections being interchangeable and each removable intact independently of the other units, and removable means for securing the sections in the frame.

9. In combination with a supporting-frame, a plurality of unitary sifting-sections compactly arranged side by side each independent of the others and constituting a complete separator, each section having a series of superposed sieves and discharges therefrom, and means for securing the unitary sections in the frame, each of said sections being removable intact from the frame independently of the other sections.

10. In combination with a supporting-frame, a plurality of interchangeable unitary sifting-sections compactly arranged side by side each independent of the others and constituting a complete separator, each section having a series of superposed sieves and discharges therefrom, and means for securing the unitary sections in the frame, each of said sections being removable intact from the frame independently of the other sections.

11. In combination with a supporting-frame, a unitary sifting-section constituting of itself a complete separator, said unitary section having a series of superposed sieves and surrounding top, bottom, side and end walls closed throughout save at their inlet and discharge points, and means for removably securing the said section in the supporting-frame.

12. As an article of manufacture a detached unitary sifting-section for bolting-machines constituting of itself a complete separator, said unitary section having a series of superposed sieves and surrounding top, bottom, side and end walls closed throughout save at their inlet and discharge points.

In testimony whereof I affix my signature in presence of two witnesses.

THOMAS W. GRAHAM.

Witnesses:
  FREDERIC THORNELY,
  F. H. WILLIAMS.